US008250356B2

United States Patent
Pruss et al.

(10) Patent No.: US 8,250,356 B2
(45) Date of Patent: Aug. 21, 2012

(54) METHOD TO CONSTRUCT A HIGH-ASSURANCE IPSEC GATEWAY USING AN UNMODIFIED COMMERCIAL IMPLEMENTATION

(75) Inventors: Brian W. Pruss, Streamwood, IL (US); Kenneth C. Fuchs, Winfield, IL (US); Timothy M. Langham, Streamwood, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 922 days.

(21) Appl. No.: 12/275,322

(22) Filed: Nov. 21, 2008

(65) Prior Publication Data

US 2010/0131750 A1   May 27, 2010

(51) Int. Cl.
  *H05L 29/06*   (2006.01)
(52) U.S. Cl. .................. 713/151; 713/150; 713/189
(58) Field of Classification Search .......... 713/151, 713/150, 189
  See application file for complete search history.

(56) References Cited

U.S. PATENT DOCUMENTS

| | | | |
|---|---|---|---|
| 7,370,348 B1 * | 5/2008 | Patel et al. ................ | 726/5 |
| 2002/0188871 A1 * | 12/2002 | Noehring et al. .......... | 713/201 |
| 2003/0050036 A1 * | 3/2003 | Hayduk et al. ............ | 455/403 |
| 2004/0039928 A1 * | 2/2004 | Elbe et al. ................ | 713/189 |
| 2005/0213768 A1 | 9/2005 | Durham et al. | |
| 2007/0177550 A1 | 8/2007 | Kwon et al. | |

OTHER PUBLICATIONS

Kent, et al., RFC 4301, Dec. 2005, "Security Architecture for the Internet Protocol" (http://tools.ietf.org/html/rfc4301).
S. Kent, RFC 4303, Dec. 2005, "IP Encapsulating Security Protocol" (http://www.ietf.org/rfc/rfc4303.txt).
"Cryptographic Modules Validation Program Frequently Asked Questions", Dec. 4, 2007, http://csrc.nist.gov/groups/STM/cmvp/documents/CMVPFAQ.pdf.
"Implementation Guidance for FIPS PUB 140-2 and the Cryptographic Module Validation Program", National Institute of Standards and Technology, Mar. 2003. http://csrc.nist.gov/groups/STM/cmvp/documents/fips140-2/FIPS1402IG.pdf.
PCT International Search Report Dated Jun. 8, 2010, 12 Pages.

* cited by examiner

*Primary Examiner* — Haresh N Patel
*Assistant Examiner* — Dao Ho
(74) *Attorney, Agent, or Firm* — Anthony Curtis; Kenneth Haas

(57) ABSTRACT

A system and method of providing secure communications is provided. Messages are encrypted or decrypted in protected memory of a processor. Outbound messages from a secure network are prepared for encryption by adding a header outside of the protected memory and then encrypted in the protected memory. The encryption is performed by retrieving a key from a key cache as designated by rules in the header. The encrypted message is sent to the unsecure network. An inbound message from an unsecure network that is received in unprotected memory is sent to a decryption module in protected memory. The inbound message is decrypted using a key designated in its header and retrieved from the key cache. The decrypted message is returned to the unprotected memory, where it is stripped of the encryption header and then sent to its destination within the secure network.

14 Claims, 3 Drawing Sheets

METHOD TO CONSTRUCT A HIGH-ASSURANCE IPSEC GATEWAY USING AN UNMODIFIED COMMERCIAL IMPLEMENTATION

TECHNICAL FIELD

This application relates to a system and method of providing a secure gateway between networks, and more particularly to a secure gateway in which commercial software components are used.

BACKGROUND

In many network systems, it is desirable to add a cryptographic element to provide secure communications between endpoints. To provide security, the communications are encrypted on the transmitting end and decrypted at the receiving end using an encryption algorithm and corresponding key for the algorithm. The overall system contains "Red" and "Black" Networks. The Red Network is a secure network, for example a local area network (LAN), in which sensitive information is transmitted between trusted devices. Within the Red Network, messages are transmitted without encryption. The Black Network, however, is an unsecure network, such as the internet. Sensitive information from the Red Network is encrypted prior to being transmitted through the Black Network. Encrypted messages from the Red Network traverse the Black Network to reach an end device in either the Black Network or a different Red Network, in either of which they are decrypted. The Red-Black separation between the Red and Black Networks may occur in a microprocessor. One standard available for applying encryption to IP messages is called IPSec. The Red-Black separation in such an implementation is consequently referred to as an IPSec gateway.

Different entities have different security needs. For example, the security needs of a commercial vendor may be different from that of a government agency. Entities that have higher security requirements with regards to Red-Black separation and fault tolerance (i.e., tolerance to keys or unprotected data being accidently provided to the Black Network) in the past have had to use expensive, custom-built systems to provide the security as the requirements have not been able to be met with an off-the-shelf IPSec implementation. It is desirable to use commercial IPSec implementations while being able to provide a high level of security.

BRIEF DESCRIPTION OF THE DRAWINGS

Embodiments will now be described by way of example with reference to the accompanying drawings, in which.

One of skill in the art will appreciate that elements in the figures are illustrated for simplicity and clarity and have not necessarily been drawn to scale. For example, the dimensions of some of the elements in the figures may be exaggerated relative to other elements to help to improve understanding of the embodiments described.

DETAILED DESCRIPTION

A cryptographic system and method of providing secure communications is provided. The cryptographic system encrypts outbound messages and decrypts inbound messages. An IP stack in a separate (unprotected or protected) memory of the cryptographic system receives an outbound plaintext message and prepares it for encryption but may not, itself, encrypt the message although having this functionality. Once the plaintext message is prepared for encryption by the IP stack, an encryption module in protected memory provides the encryption using a selected encryption algorithm and key. The encrypted outbound ciphertext message is then sent to its destination. An inbound ciphertext message is received by the IP stack, where it is reformed and sent to a separate decryption module in protected memory. The inbound ciphertext message is decrypted using the encryption algorithm and key to form an inbound plaintext message. As the IP stack (and other unprotected software modules) has no contact with the keys for at least one encryption, the risk of compromise of sensitive data is minimized.

Figure 1:
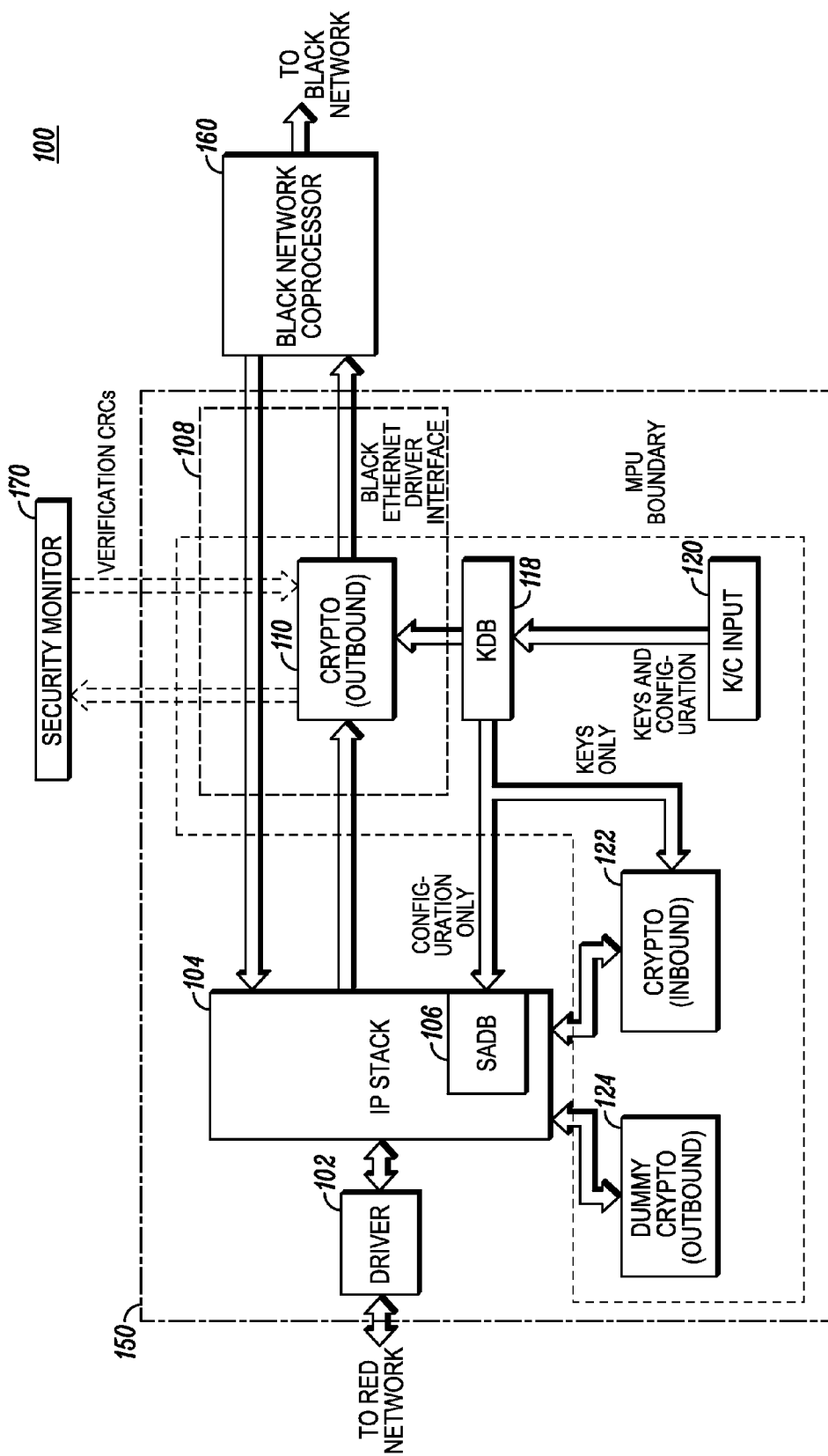
FIG. 1 is a block diagram of one embodiment of an IPSec gateway.

In the proceeding embodiments, an IPSec embodiment is described. It is to be noted, however, that other embodiments may be used without loss of generality. FIG. 1 illustrates an embodiment of an IPSec gateway 100 implemented using multiple microprocessor units (MPUs) 150, 160 of a transceiver or the like. The IPSec gateway 100 contains a number of software modules that are generally known to one of skill in the art and thus will only be minimally described. Portions of the MPU 150 memory that contain at least some of these software modules are areas of protected memory that are protected from being accessed except by predetermined processes/threads, software modules or secure devices using hardware designed for this purpose. Protecting portions of the memory is a standard function provided by many operating systems (OSs). For example, the inbound and outbound Crypo modules 110, 122 described below are in one or more memory regions protected by the OS from access by the IP Stack 104 in the embodiment shown in FIG. 1. These protected memory portions are shown as dotted or dot-dashed lines in FIG. 1. The IPSec gateway 100 performs security operations on inward-bound (i.e., to the Red Network) and outward-bound (i.e., to the Black Network) messages. In one embodiment, when information crosses the boundary shown by the dotted or dot-dashed lines in FIG. 1, as well as being transferred the information is temporarily stored in a buffer (not shown) on the side from which the information is being sent. Thus, the OS, which has privileged access to all memory areas, copies the message from the memory of the sending process into the memory of the receiving process using a built-in OS mechanism. In other platforms, buffering is not provided and the mechanism for crossing a memory protection boundary may be different.

The software modules include an IP stack 104. The IP stack 104 is a software implementation of a computer networking protocol suite and has a native (i.e., programmed) Application Programming Interface (API) that is able to provide a minimum level of security for messages. The IPSec gateway 100 of FIG. 1 uses the native API of the IP stack 104 to prevent security breaches without resorting to a specialized arrangement in which all security operations are performed by separate components.

As shown in FIG. 1, the IP stack 104 is connected to the Red Network through a Red Network driver interface 102, such as an Ethernet driver interface. The IP stack 104 contains a security association database (SADB) 106 in which generally cryptographic algorithms and keys are specified. As is known in the art, a key is a piece of information that determines the functional output of a cryptographic algorithm. The key specifies the particular transformation of plaintext (unencrypted data) into ciphertext (encrypted data), or vice versa during decryption. Many types of well known algorithms and keys exist. For example, the cryptographic system may use a symmetric key cipher, in which encryption and decryption use the same key, or an asymmetric key cipher, in which encryption and decryption use different keys. In the embodiment shown, the IP stack 104 is not provided in the protected memory of the MPU. Also connected to the IP stack 104, and in protected memory in the embodiment shown in FIG. 1, are a first cryptographic module 110 for outbound messages (Crypto (Outbound)), a second cryptographic module 122 for inbound messages (Crypto (Inbound)), and a third cryptographic module 124 for outbound messages (Dummy Crypto (Outbound)).

Other software modules in the protected memory section of the IP gateway 100 include a key database (or key cache) 118 (KDB), and a Key and Configuration (K/C) Input 120. The outbound Crypto module 110 is one module in a driver interface 108 that is connected to a Black Network coprocessor 160. The Black Network coprocessor 160 routes communication between the MCU 150 and the Black Network. The driver interface 108 may contain one or more conventional driver interface modules, such as a PPP (Point-to-Point Protocol) driver module and/or an Ethernet driver module, each of which may be connected to a serial interface, to provide communication between the driver interface 108 and the Black Network coprocessor 160.

The K/C Input 120 may receive the keys and configuration separately or in a single communication. One example of a K/C Input 120 is an over-the-air key (OTAK) receiver (also called a key variable loader or KVL). The K/C Input 120 receives algorithm and key information from one or more sources. This information, for example, can be provided using an over-the-Ethernet (OTEK) protocol from the Red or Black Networks, from secure entities in neither of these networks, or may be preprogrammed. The K/C Input 120 supplies the information received to the KDB 118, where it is stored therein, as well to an optional external security monitor 170.

The security monitor 170 is an MCU that is used to monitor outbound messages from the IP stack 104 to help minimize faults in the system by performing a redundant encryption. The security monitor 170 receives the outbound plaintext message from the outbound Crypto module 110, encrypts it using the proper key from the KDB 118 (the same key used by the outbound Crypto module 110 and received by the K/C Input 120) and the rules embedded in the plaintext message to form a ciphertext message. The security monitor 170 then calculates a cyclic Redundancy check (CRC) over its generated ciphertext and returns it to the outbound Crypto module 110, where it is appended to the outbound ciphertext message generated by the outbound Crypto module 110. The outbound ciphertext message containing the CRC is forwarded to the Black Network coprocessor 160.

The Black Network coprocessor 160 then computes the CRC over the received ciphertext and compares it against the received CRC. If they match, the Black Network coprocessor 160 determines that the security monitor 170 and the outbound Crypto module 110 both computed the same ciphertext and that the ciphertext is safe to transmit to other components to which it is connected. The CRC is then stripped from the ciphertext and sent from the Black Network coprocessor 160 to the Black Network. The CRC may be provided to the KDB 118 for later retrieval and use when checking inbound messages. In other embodiments, one or more verifiers in addition to or other than the CRC may be produced by the security monitor 170 and supplied to the outbound Crypto module 110 to be sent with the outbound ciphertext message for verification by the Black Network coprocessor 160 (and subsequent stripping if the verifiers match).

In one embodiment of the IPSec gateway 100, the IP Stack 104 receives a packet from the internal Red Network (assuming a packet-based communication system) through the Red Network interface through the Ethernet driver interface 102. The IP stack 104 prepares the packet for encryption by adding fields such as an IP Sec protocol header to the packet. The IPSec protocol header includes, for example, an Initialization Vector (IV) which, as is known, is a block of bits in a packet that allows a cipher to be executed in any of several operation modes to produce a unique output independent from other outputs produced by the same encryption key.

The SADB 106 of the IP Stack 104 receives rules from the KDB 118 on how the packet is to be encrypted. The rules include instructions about which encryption algorithm to use, determined by the source of the packet in the Red Network, the destination of the packet in the Black (or other Red) network, and other information in the IP header of the packet. Once the packet is prepared to be encrypted, the prepared packet and rules are sent to the Dummy Crypto module 124. However, rather than encrypting the data, the Dummy Crypto module 124 instead passes back the unencrypted packet back to the IP stack 104 (along with the rules for later use). Although the Dummy Crypto module 124 is shown as being in the protective memory, it may be in the same unprotected portion of the MCU memory as the IP Stack 104. The IP Stack 104 then provides the unencrypted packet to the interface driver 108, using a built-in OS function to cross the memory protection boundary.

The outbound Crypto module 110 of the interface driver 108 receives the packet from the IP Stack 104. Reception of the packet by the outbound Crypto module 110 causes the outbound Crypto module 110 to fetch the appropriate key from the KDB 118. The outbound Crypto module 110 encrypts the packet using the rules inserted by the Dummy Crypto module 124, receives the CRC from the security monitor, and appends the CRC to the encrypted packet. The encrypted packet from the outbound Crypto module 110 is provided to the PPP driver module and/or Ethernet driver module. These modules may provide the encrypted packet to a SSI module, which in turn sends the encrypted packet to the Black Network through the Black Network coprocessor 160 to be transmitted to its ultimate destination where the encrypted packet is decrypted.

When an encrypted packet is transmitted from the Black Network through the Black Network coprocessor 160 to a destination in the Red Network, the IP stack 104 receives the encrypted packet from the protected driver interface 108. The IP stack 104 extracts the rules from the IP header of the encrypted packet and sends the packet and rules across the protection boundary to the inbound Crypto module 122. The inbound Crypto module 122 requests the appropriate key from the KDB 118 based on the rules and decrypts the packet data using the algorithm specified by the rules and the key from the KDB 118. Once decrypted, the decrypted packet is passed back across the protection boundary to the IP stack 104, where it is restructured to strip off the IP header for transmission through the Ethernet driver 102 to the Red Network.

If additional fault tolerance is desired, in another embodiment the IP Stack 104 may encrypt the data itself using a different key and/or algorithm. In this embodiment, the Dummy Crypto module 122 is replaced by an additional cryptographic module that actually encrypts the packet data using the IP header information after sending the data either across the memory protection boundary or not. When the encrypted packet is provided encrypted data may be further encrypted at the outbound Crypto module 110 using the IP header information. Alternately, the encryption performed by the additional cryptographic module may be undone in the interface driver 108 or in a Redundant processor (not shown). In such an embodiment, inbound packets are decrypted using the same procedure in reverse.

In the above packet-based embodiments, the packets that form a message may be fragmented and the fragments received out of order due, for example, to being transmitted over multiple intermediaries which may break apart the message. If the packets that form a message are fragmented and received out of order, they are buffered until at least the first fragment containing the IV is received. Portions of the memory that are used to buffer the fragments are not shown for convenience in FIG. 1.

The above may be implemented in any platform supporting memory protection. For example, platforms such as the Intel x86/Pentium family of microprocessors and the Freescale/IBM PowerPC family may be used, as may be Advanced RISC Machine (ARM)-based platforms.

In addition to packet-based communications, circuit-based communications may use similar techniques. Also, although the cryptographic functions have been shown in FIG. 1 as being provided by the MCU 150, they may instead be provided by separate components in the Red Network. In addition, although the inbound Crypto module is shown as being in protected memory, to simplify the arrangement and memory management it may instead be disposed in unprotected memory. This, however, exposes keys to the commercial (and potentially non-trusted) software in the IP stack, which may be unacceptable in a high-assurance cryptographic system. In such an embodiment, the inbound Crypto module may be in the API of the IP stack.

Figure 2:
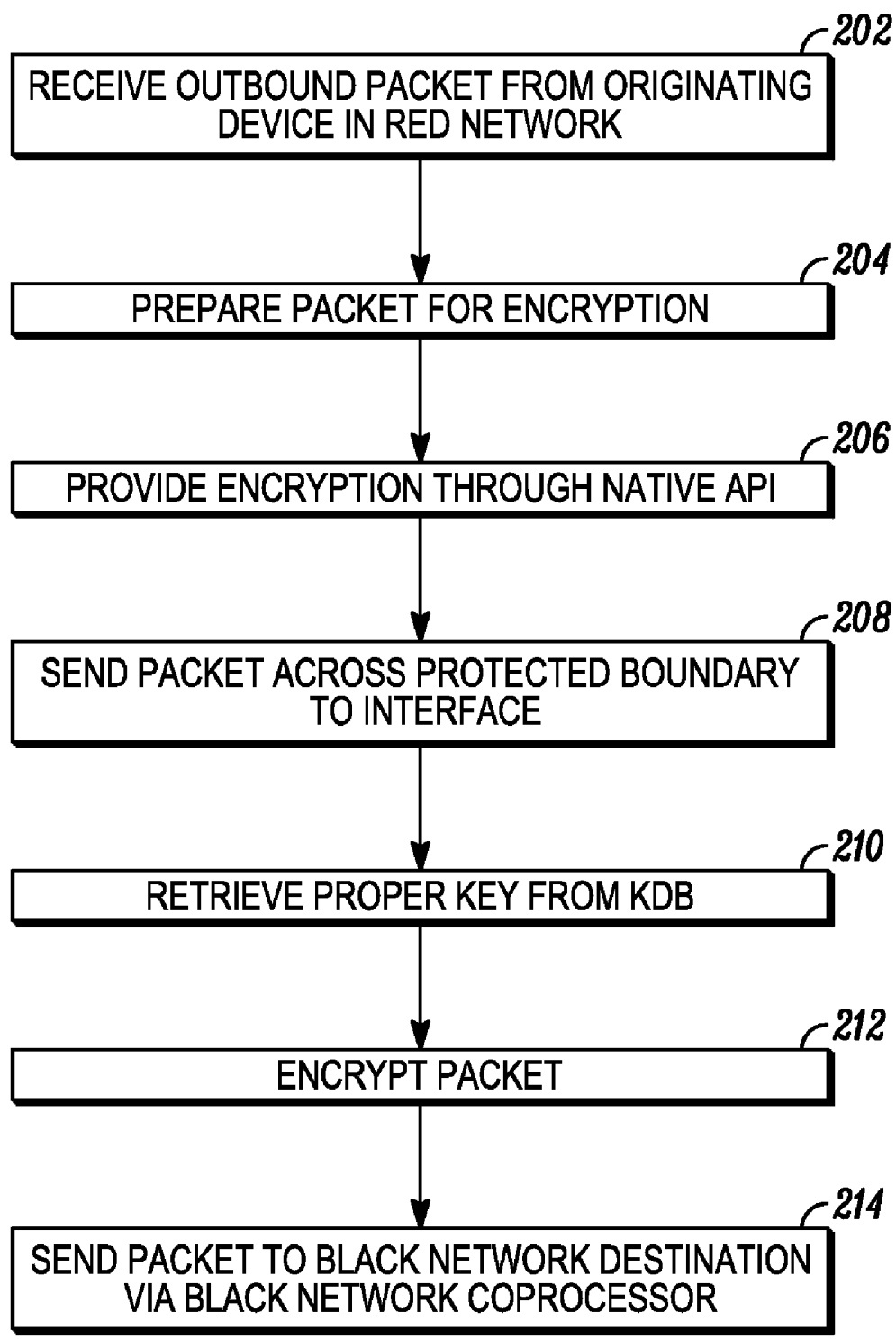
FIG. 2 is a flow chart of the encryption process of FIG. 1.
Figure 3:
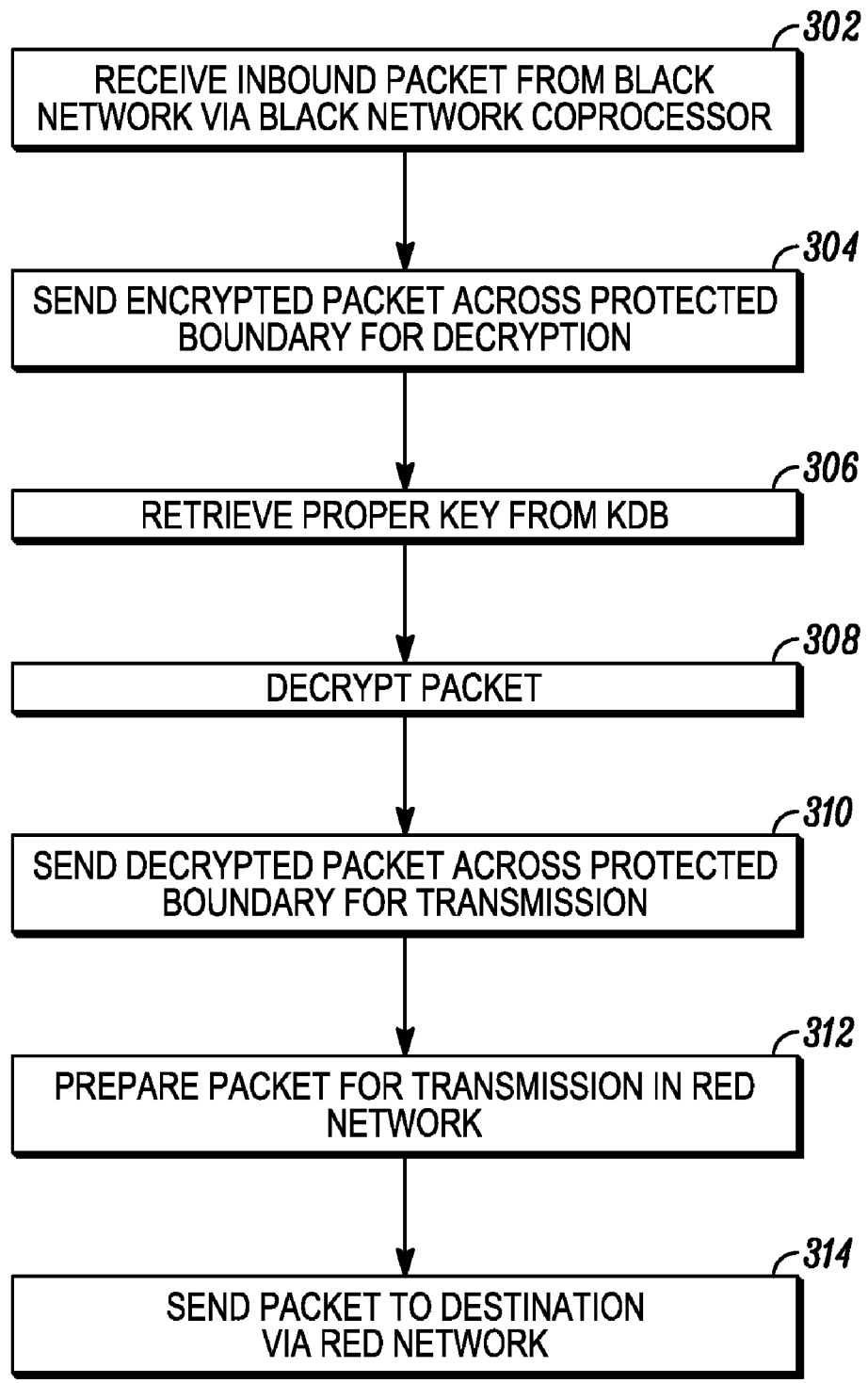
FIG. 3 is a flow chart of the decryption process of FIG. 1.

FIGS. 2 and 3 illustrate flow charts of the above encryption and decryption processes. In FIG. 2, the IP stack receives a packet from a device in the Red Network (202). The IP stack prepares the packet for encryption by one or more headers, which include the encryption rules retrieved from the KDB, to the packet (204). The IP stack then provides the prepared packet to its native API for encryption (206). Whether or not the data in the packet is encrypted by the API, afterwards, the IP stack sends the packet to an interface across the protected memory boundary for transmission to the Black Network (208). A cryptographic module in the interface receives the packet, extracts the rules from the added header, and retrieves the appropriate key from the KDB (210) as indicated by the rules. If the API has encrypted the data, the module may decrypt the data or may leave the encryption intact. Regardless, using the key and algorithm in the header, the module encrypts the data in the packet (212). A CRC may be added to the packet before or after encryption. The interface then sends the encrypted packet to the Black Network and its destination via Black Network coprocessor (214).

In FIG. 3, the IP stack receives a packet from the Black Network via Black Network coprocessor (302). The IP stack provides the encrypted packet across the protected memory boundary to a cryptographic module (304). The module receives the packet, extracts the rules from the header, and retrieves the appropriate key from the KDB (306) as indicated by the rules. The module then decrypts the data in the packet using the key and algorithm (308) and sends the encrypted packet back across the protected memory boundary to the IP stack (310). The module may, if a CRC is present, verify the packet using the CRC before or after decryption. The IP stack then prepares the packet for transmission to its destination in the Red Network (312). To accomplish this, the IP stack removes the encryption header. Before doing so, the IP stack also decrypts the packet data using its native API, if this encryption has been used. The IP stack then sends the encrypted packet to its destination in the Red Network (314).

In addition, although the IP stack is described as being disposed in an area or region of unprotected memory (and the other modules are described as being disposed in areas of protected or unprotected memory), the IP stack may be disposed in an area of protected memory.

The flowcharts and block diagrams in the figures illustrate the architecture, functionality, and operation of possible implementations of systems, methods and computer program products according to various embodiments described herein. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The above embodiments can be realized in hardware, software, or a combination of hardware and software. The embodiments can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The embodiments also can be embedded in a computer-usable medium, such as a computer program product or other data programs storage device, readable by a machine, tangibly embodying a program of instructions executable by the machine to perform methods and processes described herein. The embodiments also can be embedded in an application product which comprises all the features enabling the implementation of the methods described herein and, which when loaded in a processing system, is able to carry out these methods.

The terms "computer program," "program code," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A cryptographic system having an operating system (OS), the system comprising:
    an IP stack modifying an outbound message by adding an IPSec protocol header to a message from a secure network to produce an outbound message;
    a dummy cryptographic module performing no encryption, and supplied with the modified outbound message from the IP stack and providing the IP stack with rules used for outbound encryption;
    a key database containing keys, the key database in a first protected memory region protected by the OS from access by the IP Stack; and
    a second hardware cryptographic module within a second protected memory region protected by the OS from access by the IP Stack and supplied with the modified outbound message from the IP stack and supplied with second rules used for encrypting the outbound message, the second hardware cryptographic module encrypting the modified outbound message to produce an encrypted outbound message using an encryption rule from the header, the second hardware cryptographic module retrieving an encryption key from the key database based on the second rules, the second hardware cryptographic module sending the encrypted outbound message to an unsecure network.

2. The system of claim 1, further comprising a third cryptographic module supplied with an inbound message from the IP stack, the inbound message from the unsecure network, the third cryptographic module decrypting the inbound message to produce a decrypted inbound message using a decryption rule from a header of the inbound message, the third cryptographic module retrieving a decryption key from the key database based on the decryption rule, the third cryptographic module returning the decrypted inbound to the IP stack, where the header is stripped from the decrypted inbound message to produce a modified inbound message and sent to the secure network.

3. The system of claim 2, wherein the third cryptographic module is in a third protected memory region protected by the OS from access by the IP Stack.

4. The system of claim 2, wherein the third cryptographic module is in a memory region accessible to the IP Stack.

5. The system of claim 1, wherein the first cryptographic module is in a fourth protected memory region protected by the OS from access by the IP Stack.

6. The system of claim 1, wherein the second cryptographic module:
    forwards a copy of the modified outbound message to a second processor that:
        retrieves the encryption key from the key database based on the encryption rule,
        encrypts the modified outbound message to produce another encrypted outbound message using the encryption rule from the header,
        produces a verifier based on the other encrypted outbound message, and
        provides the verifier to the second cryptographic module, and
    appends the verifier to the encrypted outbound message.

7. The system of claim 6, further comprising a third processor that:
    receives the encrypted outbound message and verifier,
    computes a checking verifier over the encrypted outbound message,
    determines whether the encrypted outbound message is safe to transmit to the unsecure network by comparing the checking verifier against the received verifier, and
    if the checking and received verifiers match, strips the received verifier from the encrypted outbound message and transmits the encrypted outbound message to the unsecure network.

8. A cryptographic method comprising, in a processor having an operating system (OS):
    preparing a message from a secure network for encryption by adding an IPSec protocol header in an IP stack to the message to produce an outbound message;
    supplying the outbound message to a dummy cryptographic module, the dummy cryptographic module being a native Application Programming Interface of the IP stack, the dummy encryption module performing no encryption;
    providing the IP stack with rules used for outbound encryption by the dummy cryptographic module to the IP stack in response to receiving the outbound message;
    supplying the modified outbound message from the IP stack to a second hardware cryptographic module in a first protected memory region protected by the OS from access by the IP Stack;
    retrieving an encryption key from a key database based on an encryption rule from the header of the modified outbound message in the second cryptographic module;

encrypting the modified outbound message in the second hardware cryptographic module to produce an encrypted outbound message using the encryption rule; and sending the encrypted outbound message to an unsecure network.

9. The method of claim 8, wherein the first cryptographic module is in a second protected memory region protected by the OS from access by the IP Stack.

10. The method of claim 8, further comprising:
supplying an inbound message from the unsecure network to the IP stack;
supplying the inbound message from the IP stack to a third cryptographic module;
retrieving a decryption key from the key database based on a decryption rule from a header of the inbound message;
decrypting the inbound message in the third cryptographic module to produce a decrypted inbound message using the decryption rule;
returning the decrypted inbound to the IP stack;
stripping the header from the decrypted inbound message to produce a modified inbound message in the IP stack; and
sending the modified inbound message to the secure network.

11. The method of claim 8, further comprising:
forwarding a copy of the modified outbound message to a second processor that:
retrieves the encryption key from the key database based on the encryption rule,
encrypts the modified outbound message to produce another encrypted outbound message using the encryption rule from the header,
produces a verifier based on the other encrypted outbound message, and
provides the verifier to the second cryptographic module, and
appending the verifier to the encrypted outbound message.

12. The method of claim 11, further comprising in a third processor:
receiving the encrypted outbound message and verifier;
computing a checking verifier over the encrypted outbound message;
determining whether the encrypted outbound message is safe to transmit to the unsecure network by comparing the checking verifier against the received verifier; and
if the checking and received verifiers match, stripping the received verifier from the encrypted outbound message and transmitting the encrypted outbound message to the unsecure network.

13. A processor comprising:
an operating system (OS) enforcing memory protection boundaries between software modules; and
a plurality of software modules including an outbound hardware cryptographic module in a first protected memory region protected by the OS from access by other software modules and a dummy cryptographic module in a region in which other software modules are allowed access by the OS, the processor encrypting an outbound packet from a secure network to an unsecure network using the outbound hardware cryptographic module, the dummy cryptographic module being supplied with the outbound packet prior to the outbound packet being supplied with the outbound packet but not encrypting the outbound packet even though being supplied with the outbound packet to encrypt the outbound packet.

14. The processor of claim 13, wherein the software modules further comprise an inbound cryptographic module in a second protected memory region protected by the OS from access by other software modules, the inbound cryptographic module supplied with an inbound message from the unsecure network and decrypting the inbound message.

* * * * *

UNITED STATES PATENT AND TRADEMARK OFFICE
CERTIFICATE OF CORRECTION

PATENT NO. : 8,250,356 B2  
APPLICATION NO. : 12/275322  
DATED : August 21, 2012  
INVENTOR(S) : Pruss et al.

Page 1 of 1

It is certified that error appears in the above-identified patent and that said Letters Patent is hereby corrected as shown below:

In Column 2, Line 32, delete "Crypo" and insert -- Crypto --, therefor.

Signed and Sealed this  
Fifth Day of February, 2013

Teresa Stanek Rea  
*Acting Director of the United States Patent and Trademark Office*